(12) United States Patent
Peters

(10) Patent No.: US 11,892,093 B2
(45) Date of Patent: Feb. 6, 2024

(54) FORCE BALANCED RECIPROCATING VALVE

(71) Applicant: Volker Peters, Wienhausen (DE)

(72) Inventor: Volker Peters, Wienhausen (DE)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 330 days.

(21) Appl. No.: 16/919,754

(22) Filed: Jul. 2, 2020

(65) Prior Publication Data

US 2021/0003230 A1    Jan. 7, 2021

Related U.S. Application Data

(60) Provisional application No. 62/870,261, filed on Jul. 3, 2019.

(51) Int. Cl.
| | |
|---|---|
| *F16K 31/52* | (2006.01) |
| *E21B 47/24* | (2012.01) |
| *F16K 31/122* | (2006.01) |

(52) U.S. Cl.
CPC .......... *F16K 31/1223* (2013.01); *F16K 31/52* (2013.01)

(58) Field of Classification Search
CPC ...... F16K 31/52; F16K 31/1223; E21B 47/18; E21B 47/20; E21B 47/22; E21B 47/24
See application file for complete search history.

(56) References Cited

U.S. PATENT DOCUMENTS

| | | | |
|---|---|---|---|
| 4,641,289 A * | 2/1987 | Jurgens | .................... E21B 47/24 367/83 |
| 5,586,084 A | 12/1996 | Barron et al. | |
| 7,319,638 B2 * | 1/2008 | Collette | ............... G01V 11/002 340/854.4 |
| 8,917,575 B2 | 12/2014 | Peters | |
| 9,243,492 B2 | 1/2016 | Fraser | |
| 2005/0260089 A1 * | 11/2005 | Hahn | ...................... H04L 27/10 417/505 |

FOREIGN PATENT DOCUMENTS

| | | |
|---|---|---|
| WO | 02059461 A1 | 8/2002 |
| WO | 2008053155 A1 | 5/2008 |

OTHER PUBLICATIONS

International Preliminary Report on Patentability for International Application No. PCT/US2020/040602, dated Oct. 5, 2020, 5 pages.

* cited by examiner

*Primary Examiner* — Paul J Gray
(74) *Attorney, Agent, or Firm* — CANTOR COLBURN LLP

(57) ABSTRACT

A device for generating pressure pulses includes a valve member disposed in a fluid passageway, the fluid passageway including a restriction, the valve member movable by an actuator relative to the restriction to generate a pressure pulse in a fluid in the fluid passageway based on varying a relative position between the valve member and the restriction and creating a differential pressure across the fluid passageway, the differential pressure applying a first force on the valve member. The device also includes a piston member in hydraulic communication with the differential pressure, the differential pressure applying a second force on the piston member, the piston member having a locomotive mechanical connection to the valve member.

20 Claims, 14 Drawing Sheets

US 11,892,093 B2

FORCE BALANCED RECIPROCATING VALVE

CROSS REFERENCE TO RELATED APPLICATIONS

This application claims the benefit of an earlier filing date from U.S. Provisional Application Ser. No. 62/870,261 filed Jul. 3, 2019, the entire disclosure of which is incorporated herein by reference.

BACKGROUND

In the resource recovery industry, various downhole tools are employed for purposes such as flow control, drilling, directional drilling and formation property measurements. Examples of such tools include logging-while-drilling (LWD) and measurement-while-drilling (MWD) tools. Communication between tools and/or between tools and the surface can be accomplished using various telemetry systems.

One type of telemetry is mud pulse telemetry, which involves transmitting communications via pressure pulses in borehole fluid, such as drilling mud. Typically, downhole data is encoded into a digital format and pressure pulses are transmitted from a pulser to a receiver.

SUMMARY

An embodiment of a device for generating pressure pulses includes a valve member disposed in a fluid passageway, the fluid passageway including a restriction, the valve member movable by an actuator relative to the restriction to generate a pressure pulse in a fluid in the fluid passageway based on varying a relative position between the valve member and the restriction and creating a differential pressure across the fluid passageway, the differential pressure applying a first force on the valve member. The device also includes a piston member in hydraulic communication with the differential pressure, the differential pressure applying a second force on the piston member, the piston member having a locomotive mechanical connection to the valve member.

An embodiment of a method of generating pressure pulses includes receiving a communication at a processing device, the processing device configured to control a communication module including a valve member and a restriction disposed in a fluid passageway, controlling, by an actuator, movement of the valve member relative to the restriction to generate pressure pulses in a fluid in the passageway based on varying a relative position between the valve member and the restriction and creating a differential pressure across the passageway, the differential pressure applying a first force on the valve member, and transmitting the pressure pulses through the fluid to a receiver. The communication module includes a piston member in hydraulic communication with the differential pressure, the differential pressure applying a second force on the piston member, the piston member having a locomotive mechanical connection to the valve member.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the figures.

Disclosed are devices, systems and methods for generating fluid pressure signals and communicating via mud pulse telemetry. An embodiment of a telemetry device includes a valve member moveable relative to a restriction in a fluid passageway to generate fluid pulses. Fluid pulses are generated by moving the valve member in an oscillating manner to create pressure differentials that are transmitted through borehole fluid to a receiver. The telemetry device also includes a force balancing assembly configured to use fluid pressure to counteract valve forces exerted on the valve member by the pressure differentials.

In one embodiment, the force balancing assembly includes a secondary member (e.g., a piston member) in pressure communication with the fluid passageway. The force balancing assembly includes a locomotive mechanical connection between the valve member and the secondary member that transmits forces on the secondary member to the valve member. The transmitted force at least partially cancels out the valve forces, allowing the valve member to be actuated with lower mechanical power than would be needed without the force balancing assembly.

Embodiments described herein provide a number of advantages and technical effects. Embodiments allow telemetry devices to be actuated with significantly less actuation force by balancing the hydraulic forces on the valve member. With hydraulic forces being reduced or canceled, the required power to drive the valve member is significantly reduced. Embodiments described herein allow for the realization of a plunger valve for high data rate mud pulse telemetry, maintaining the benefits of the plunger valve with respect to lost circulation material (LCM) capability, plugging resistance and wide flow range adaptivity at high signal strength (pulse pressure).

Hydraulically assisted pilot (or servo) valves are typically not actively position controlled and might have issues with plugging, sedimentation or wear in the pilot valve section. Lab and field testing of plunger valves demonstrate their advantages over rotary valves in terms of ruggedness, flow and density spread, and plugging resistance. The embodiments described herein feature the advantages of plunger valve configurations while maintaining capability for high speed mud pulse telemetry.

Figure 1:
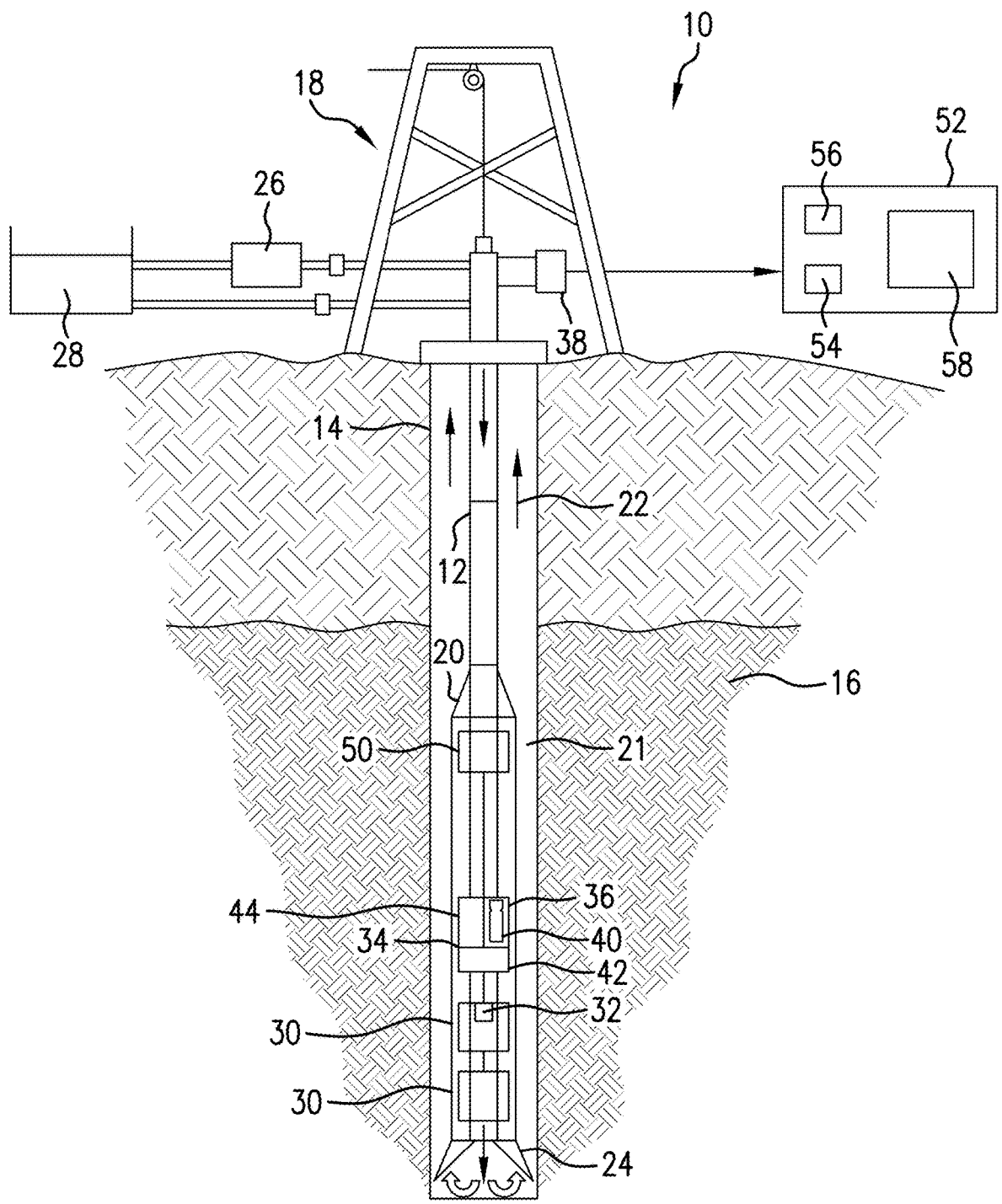
FIG. 1 depicts an embodiment of a system for performing an energy industry operation, the system including a communication module configured for mud pulse telemetry.

FIG. 1 shows an embodiment of a system 10 for performing an energy industry operation (e.g., drilling, measurement, stimulation, well construction, well completion and/or production). The system 10 includes a borehole string 12 that is shown disposed in a well or borehole 14 that is drilled to penetrate at least one resource bearing formation 16 during a drilling or other downhole operation. As described herein, "borehole" or "wellbore" refers to a hole that makes up all or part of a drilled well. It is noted that the borehole 14 may include vertical, deviated and/or horizontal sections, and may follow any suitable or desired path. As described herein, "formations" refer to the various features and materials that may be encountered in a subsurface environment and surround the borehole 14.

The borehole string 12 is operably connected to a surface structure or surface equipment such as a drill rig 18, which includes or is connected to various components such as a surface drive or rotary table for supporting the borehole string 12, rotating the borehole string 12 and lowering string sections or other downhole components. In one embodiment, the borehole string 12 is a drill string including one or more drill pipe sections that extend downward into the borehole 14, and is connected to a bottomhole assembly (BHA) 20.

The borehole string 12 includes or forms a tubular through which fluid 22 is circulated into the borehole 14. In operation, in one embodiment, the fluid 22 is injected into the tubular and/or the borehole string 12 by the surface equipment, flows through the tubular and returns to the surface through an annulus 21 between the borehole string 12 and the borehole wall (or casing if the borehole or borehole section is cased). The fluid 22 may be any type of fluid, such as drilling fluid or stimulation fluid, and may include formation fluid such as water, gas and/or oil that enters the borehole 14.

For example, the surface equipment includes the drilling rig 18 and the fluid 22 includes drilling mud injected into the tubular to facilitate a drilling and/or measurement (e.g. logging while drilling) operations. The BHA 20 includes a drill bit 24, which in this example is driven from the surface, but may be driven from downhole (e.g., by a downhole mud motor). A pumping device 26 may be located at the surface to circulate the fluid 22 from a mud pit or other fluid source 28 into the borehole 14 as the drill bit 24 is rotated.

In the embodiment of FIG. 1, the system 10 shown is configured to perform a drilling operation, and the borehole string 12 is a drill string. However, embodiments described herein are not so limited and may have any configuration suitable for performing an energy industry operation that includes a downhole power generator. For example, the system 10 may be configured as a stimulation system and/or a completion system, which may include components such as a hydraulic fracturing assembly and/or a production assembly (including, e.g., a production sleeve and a screen).

The system 10 may include one or more of various downhole tools 30 configured to perform selected functions downhole such as performing downhole measurements, facilitating communications, performing stimulation operations and/or performing production operations. For example, one or more of the downhole tools 30 may include one or more sensors 32 for performing measurements such as logging while drilling (LWD) or measurement while drilling (MWD) measurements. Other tools include, for example, intelligent production tools, liner setting tools, and tools for logging various information while completing construction of a borehole.

The system 10 includes a telemetry assembly including a communication module 34 (e.g., a telemetry sub) for communicating with the surface and/or other downhole tools or devices. In one embodiment, the communication module 34 is configured as a mud pulse telemetry (MPT) device, which includes a pulser assembly 36 that induces pressure fluctuations in the fluid 22. The pressure fluctuations travel as pulses to a receiver 38 in fluid communication with the borehole 14. The pulses may be transmitted with, for example, modulated amplitudes and/or frequencies, as an encoded pressure signal. The pulser assembly 36 includes a valve member 40 that is controllable by an actuator assembly 42. Movement of the valve member 40 relative to a fluid passageway restriction (not shown) causes changes in differential pressures, which are transmitted upstream as pressure signals.

The pulser assembly 36 also includes a force balancing assembly 44 that is configured to counteract forces on the valve member 40 by the fluid 22. As discussed in further detail below, the force balancing assembly 44 utilizes fluid pressure to apply a balancing force that opposes fluid pressure forces on the valve member 40. The force balancing assembly 44 thereby reduces or substantially eliminates fluid pressure sources, which allows the valve member 40 to be moved by the actuator assembly 42 using less mechanical power than would otherwise be needed.

One or more downhole components and/or one or more surface components may be in communication with and/or controlled by a processor such as a downhole processor 50 and/or a surface processing unit 52. In one embodiment, the surface processing unit 52 is configured as a surface control unit which controls various parameters such as rotary speed, weight-on-bit, fluid flow parameters (e.g., pressure and flow rate) and others. The surface processing unit 52 (or other processor) can also perform monitoring and communication functions (e.g., to gather tool status information and information regarding borehole conditions).

The surface processing unit 52 (and/or the downhole processor 50) may be configured to perform functions such as controlling drilling and steering, controlling the flow rate and pressure of borehole fluid, transmitting and receiving data and communications using the communication module 34, processing measurement data, and/or monitoring operations of the system 10. The surface processing unit 52, in one embodiment, includes an input/output device 54, a processor 56, and a data storage device 58 (e.g., memory, computer-readable media, etc.) for storing data, models and/or computer programs or software that cause the processor to perform aspects of methods and processes described herein.

Figure 2:
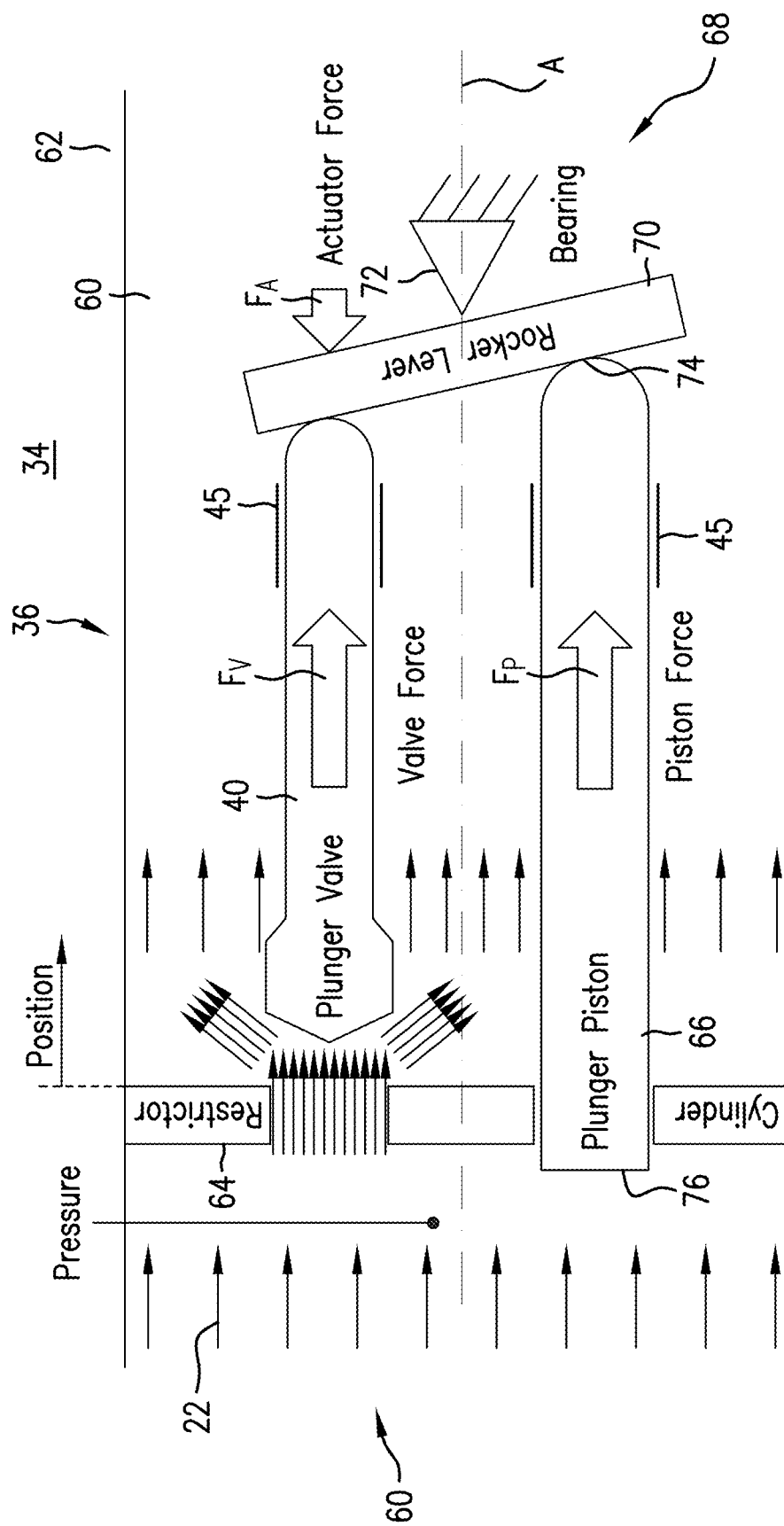
FIG. 2 depicts an embodiment of the communication module of FIG. 1.
Figure 3:
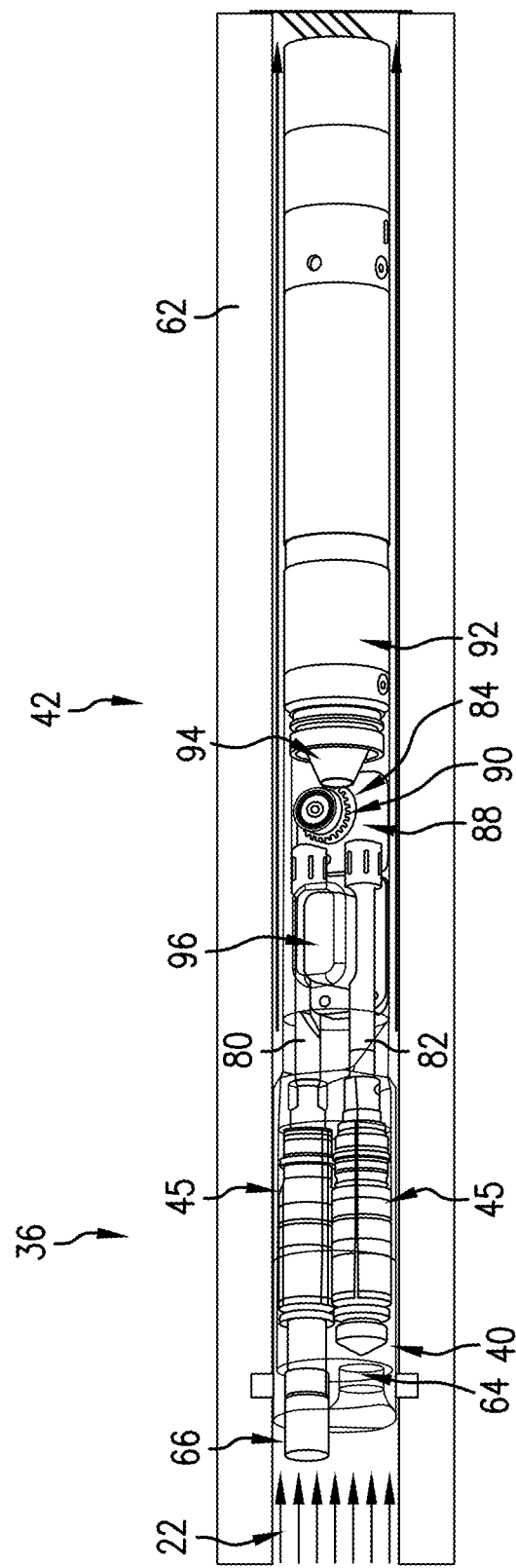
FIG. 3 depicts aspects of an embodiment of a communication module including a pulser assembly and a force balancing assembly.

FIG. 2 illustrates an embodiment of the communication module 34. In this embodiment, the valve member 40 is configured as a plunger valve member that is disposed in a fluid passageway 60. The fluid passageway 60, in one embodiment, is in fluid communication with borehole fluid 22 (e.g., drilling mud) circulated through the borehole 14. The fluid passageway 60 is defined by a housing 62, which can be a bore in a downhole component (e.g., a pipe section, drill collar, the BHA 20, etc.) or a separate housing attached to a component.

The plunger valve member 40 is moveable axially, i.e., in a direction at least substantially parallel to a longitudinal axis A of the passageway 60. The valve member 40 is axially moveable relative to a restriction 64 in the housing 62 to generate pressure pulses in the fluid 22. The restriction 64 may be integral with the housing 62 (e.g., as a protrusion extending from a wall of the housing 62) or a component attached to a surface of the housing 62.

To generate a pressure pulse, a controller (e.g., the downhole processor 50 or electronics in the communication module 34) causes an actuator to apply a force (referred to as the actuator force $F_A$) and a controlled stroke to move the valve member 40 toward the restriction 64 in the passageway. By oscillating the valve member 40 according to one or more frequencies and varying amplitude of the stroke (the amplitude of the differential pressure caused by moving the valve member 40) and/or frequency, the pressure in the fluid 22 upstream the restriction 64 is modulated accordingly. A series of encoded pulses is emitted to transmit communications.

The differential pressure (the difference in pressure between the side upstream the restriction 64 and the side downstream the restriction 64) produced by movement of the valve member 40 exerts a hydraulic force (referred to as a valve force $F_V$) on the valve member 40. The communication module 34 also includes the force balancing assembly 44, which is configured to counteract hydraulic forces including the valve force $F_V$ on the valve member 40 and thereby reduce the mechanical power required to produce pulses. The force balancing assembly 44 includes a secondary piston 66 (e.g., a plunger piston) that is exposed to the fluid 22 and to the differential pressure (between the side upstream the restriction 64 and the side downstream the restriction 64) produced as the valve member 40 moves relative to the restriction 64. The piston 66 is configured to be exposed to the fluid 22 such that pressure differentials in the passageway 60 between the side upstream the restriction 64 and the side downstream the restriction 64 also exert hydraulic force on the piston 66. The hydraulic force on the piston 66 is referred to as a piston force $F_P$.

A locomotive mechanical transmission assembly 68 is included in the communication module 34 to balance forces on the valve member 40. In one embodiment, the transmission assembly 68 includes a rocker lever bearing, which includes a rocker lever 70 mechanically coupled to a bearing 72 that acts as a fulcrum. The rocker lever 70 provides a mechanical connection between the valve member 40 and allows balancing of the valve forces. The rocker lever bearing is loaded by the valve force $F_V$ and the piston force $F_P$. Through balancing the lever arms and piston surfaces, forces can be efficiently balanced.

The piston 66 is in hydraulic communication with the high pressure side of the valve arrangement (upstream from the restrictor 64). For example, as shown in FIG. 2, the piston 66 has a first end 74 in contact (or at least coupled to transfer force) with an end of the rocker lever 70 and a second end 76 in pressure communication with the fluid upstream from the restriction 64. For example, the second end 76 extends through a cylindrical opening 78 in the passageway 60.

Whenever the valve member 40 closes and the pressure rises, the piston 66 picks up this pressure and thus creates a piston force $F_P$ upon this current pressure. As both the valve force $F_V$ and the piston force $F_P$ have the same direction, they can be connected by a suitable drive. Accordingly, a force balancing assembly such as the rocker lever mechanism reverses direction and force to cancel both forces. For example, the rocker lever mechanism transmits the piston force $F_P$ to the valve member 40 and applies the piston force $F_P$ to the valve member 40 in a direction opposite the valve force $F_V$. Likewise, the rocker lever mechanism transmits the valve force $F_V$ to the piston 66 and applies the valve force $F_V$ to the piston 66 in a direction opposite the piston force $F_P$.

Parameters of the piston 66 can be selected or designed to control the amount of force $F_P$ on the piston 66. For example, the surface area of the end 76 (and the corresponding diameter of the cylinder 78) can be selected to control the amount of force on the piston 66 and thus the amount of balancing.

With valve forces being balanced, the required power to drive the valve member 40 is significantly reduced. An actuator drive that moves the valve member 40 would primarily have to account for the inertia loads and other losses, if correctly balanced hydraulically.

Any of various configurations and mechanisms may be used to affect force balancing. In addition to or in place of the rocker lever mechanism described above, the mechanical connection of the force balancing assembly can include rack and pinion gearboxes, crank or cam devices, wobble plates, hydraulic coupling (cylinder piston devices with hydraulic communication) and others.

FIGS. 3-6 show an example of the communication module 34 and another example of a suitable force balancing assembly, employing a rack and pinion gearbox as the mechanical connection. The piston 66 and the valve member 40 (configured in this example as a plunger valve member) are moveable axially and guided by a guidance structure 45, such as a cylindrical housing or support structure. The guidance structure 45 includes respective openings that expose the piston 66 and the valve member 40 to the fluid 22. The piston 66 is mechanically coupled to a first actuator rod 80 and the valve member 40 is mechanically coupled to a second actuator rod 82.

Figure 4:
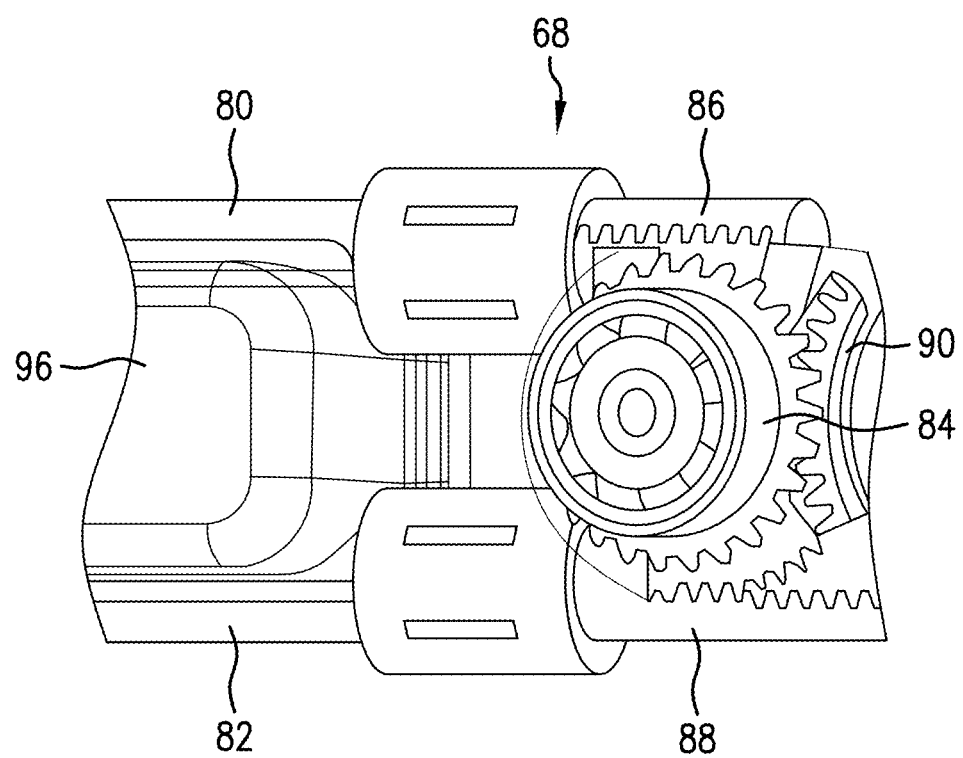
FIG. 4 depicts an embodiment of a force balancing assembly.

Referring to FIG. 4, the transmission assembly 68 in this example includes rack and pinion drives having a pinion 84, a first rack 86 connected to the piston 66 and a second rack 88 connected to the valve member 40. The rack and pinion drives are selected as a main force balancing feature to cancel out the hydraulic forces on the valve member 40. The pinion 84 is driven by a bevel gear 90 coupled to an electrical (DC) motor unit 92 (shown in FIG. 3). Any suitable gear ratio or transmission ratio can be used. For example, the transmission assembly 68 can have a 1:1 gear ratio or a different gear ratio.

Critical electrical components of the DC motor unit 92 are hydraulically separated from drilling fluid or fluid within the balancing mechanics section through a separator, such as a rubber bellows 94 or membrane, communicating the pressure and allowing for angular movement. The membrane or bellows 94 may define a different cavity that can be filled with a fluid other than the fluid 22 or the fluid within the balancing mechanics section. An independent compensator 96 may be used for the balancing mechanics section. Since the piston 66 and the valve member 40 are mechanically coupled, one of the piston 66 and the valve member 40 moves outward while the other moves inward at the same rate (for identical gear ratio). If both the valve member 40 and the piston 66 feature at least substantially identical guidance (or seal) diameter, the internal volume of the balancing mechanics section remains constant during valve movement, thus limiting or reducing compensator movement upon valve movement. Other suitable combinations of piston 66 (seal) diameter and valve member 40 (seal) diameter can be selected, while still allowing the internal volume of the balancing mechanics section to remain constant during valve movement.

In one example, the valve member 40 (seal) diameter is double the piston 66 (seal) diameter. This configuration translates into a 4 times larger hydraulic area and thus a 4 times larger volume being displaced in reciprocating movement. In this example, the piston 66 stroke length is 4 times the valve member stroke length (and in opposite direction to the piston stroke) to maintain a constant internal volume of the balancing mechanics section during valve movement, thus limiting or reducing compensator movement upon valve movement. As can be appreciated, other combinations can be selected.

Figure 5:
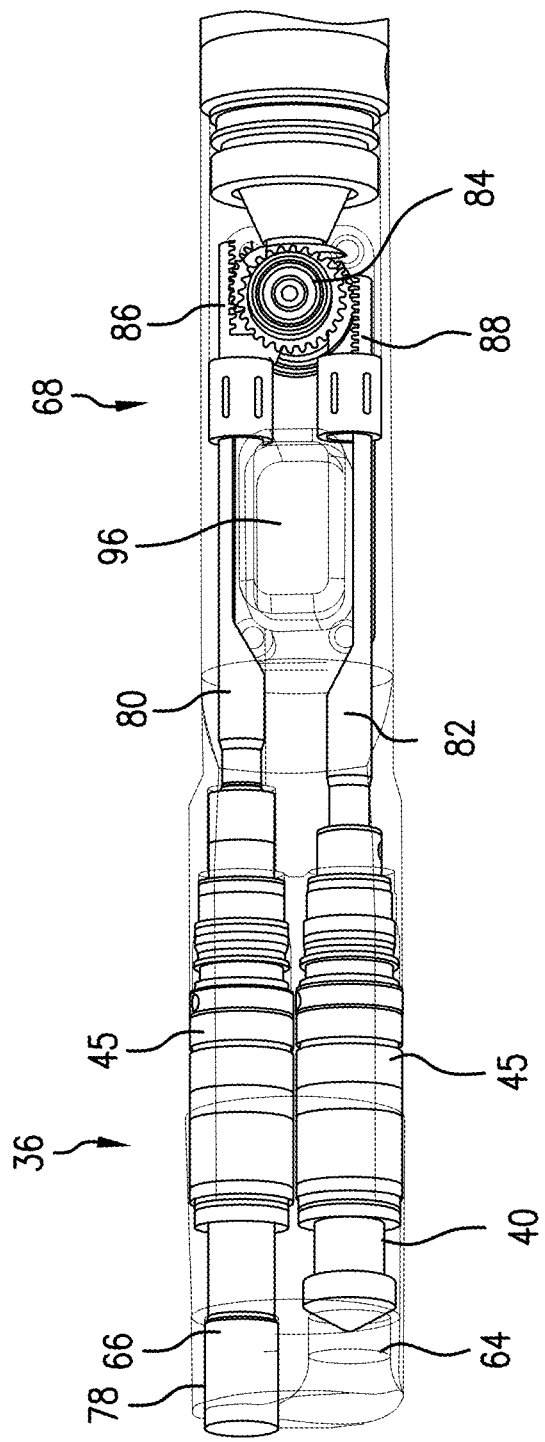
FIG. 5 depicts the pulser assembly and the force balancing assembly of FIG. 3 in a closed position.
Figure 6:
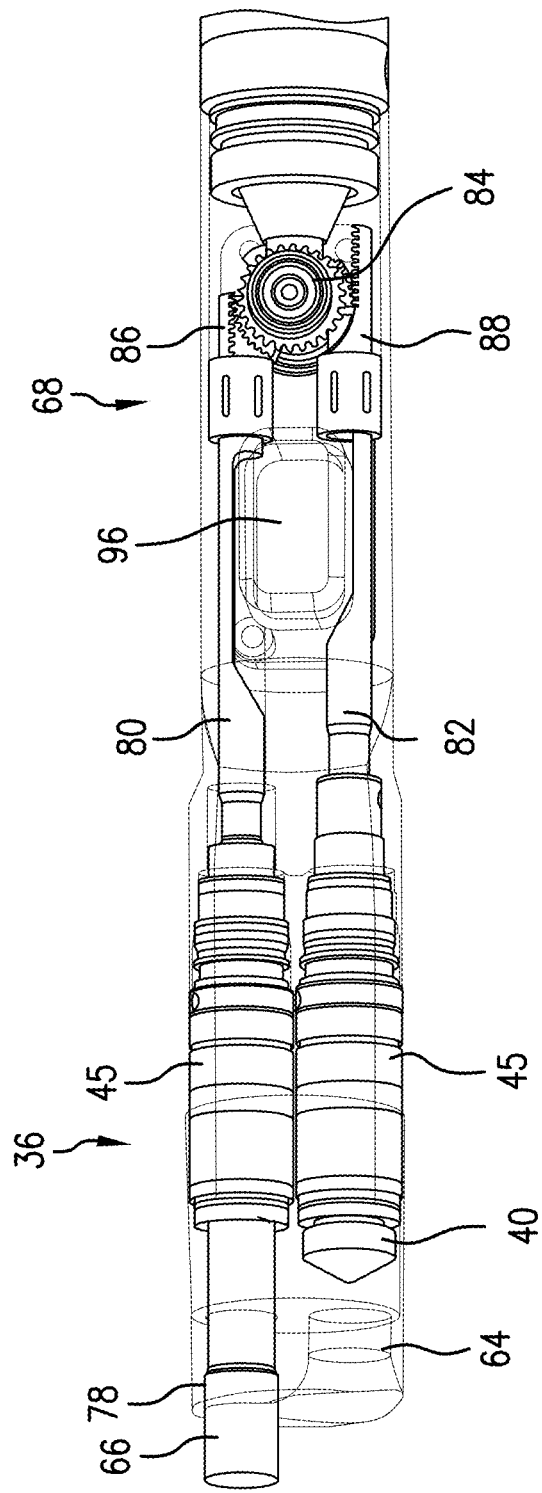
FIG. 6 depicts the pulser assembly and the force balancing assembly of FIG. 3 in an open position.

FIG. 5 shows the pulser assembly 36 in a closed (pulse) position, and FIG. 6 shows the pulser assembly 36 in an open position. In the open position, the valve member 40 is located at a first axial position away from the restriction 64 by a selected distance. The distance can be selected based on factors such as fluid flow rate, pressure, desired pulse amplitude and/or pulse frequency.

In the closed position (also referred to as a pulse position), the valve member 40 is located at a second axial position proximate to the restriction 64 and closer to the restriction 64 as compared with the open position. The valve member 40 is shown in FIG. 5 in a fully closed position and in FIG. 6 in a fully open position. At these positions, the valve member 40 (in this embodiment a plunger piston or plunger valve) is within the guidance structure (e.g., guidance cylinder) 45, and sealed against the fluid 22. The valve member 40 can be sealed by means of a narrow gap between the guidance cylinder 45, or by any other sealing mechanism (e.g., o-rings). Since the guidance cylinder 45 and the seal respectively (as part of the guidance cylinder 45), as well as the compensator 96, are positioned downstream the restriction 64, they all communicate to similar pressure levels, hence a small or no pressure drop across the seal exists, thus increasing durability and life. The valve stroke can be adjusted to cover the full flow range of one tool size. Pulse positions for small flow rates may tend towards smaller distances between the valve member 40 and the restriction 64 at the closed position, while at high flow rate the pulse positions may tend toward larger distances between the valve member 40 and the restriction 64 at the closed position and preferably also at larger stroke. Current flow rates can be measured by suitable devices in the BHA 20, such as turbines or other flow measuring devices known in the industry.

In order to create a signal pulse, the motor driven bevel gear 90 rotates some degrees in one direction, while for the opening stroke the rotation is reversed. Gear ratios can be adjusted with respect to motor torque capacity and dynamic capacity. With the oscillating movement of the actuator, open and closed positions can be individually selected upon current flow and fluid density of fluid 22 and required signal pressure. Current fluid density can be measured by a downhole device in the BHA or programmed into a downhole device (e.g., a tool 30) at surface prior to operation, and/or during operation by means of sending commands from surface to downhole (downlink). Downhole fluid density measurements can be performed using the pulser assembly 36, e.g. by detecting load or other characteristic parameters of the actuator (e.g. the electrical (DC) motor unit 92) at a certain position and flowrate. Other density measurements can be performed by dedicated devices.

Although a rack and pinion device is shown in FIGS. 3-6, alternative coupling mechanisms are feasible. Alternative mechanical connections include rack and pinion gearboxes, crank or cam devices, wobble plates, lever mechanics, and so forth. Mechanics using non-constant transmission ratios for the linear stroke might offer additional advantages. Alternatively, a hydraulic coupling between the valve member 40 and the piston 66 may be used. In addition, instead of the valve member 40 and the piston 66 being side by side, they can be positioned concentrically. Furthermore, more than two plunger devices (e.g., more than one valve member 40 and/or more than one piston 66) can be used. Springs can be added to balance inertia load or support dynamic movement.

Similar effects can be achieved using a hydraulic system, picking up the high pressure upstream the restriction 64 with a cylinder piston device and hydraulically supplying the required counterforce to the valve member 40 by means of a secondary cylinder piston device, mechanically coupled to the valve member 40. Hydraulic systems should be designed with low resistance, which may require large cross sections in the hydraulic communication lines to reduce the losses.

It is noted that, although the force balancing assembly 44 and force balancing features are described above in conjunction with a telemetry device, they are not so limited. Embodiments described herein can be used in conjunction with other devices and/or systems that are subject to fluid pressure forces. Examples of such systems include various hydraulically actuated or operated systems such as sleeves and flow control valves.

Figure 7:
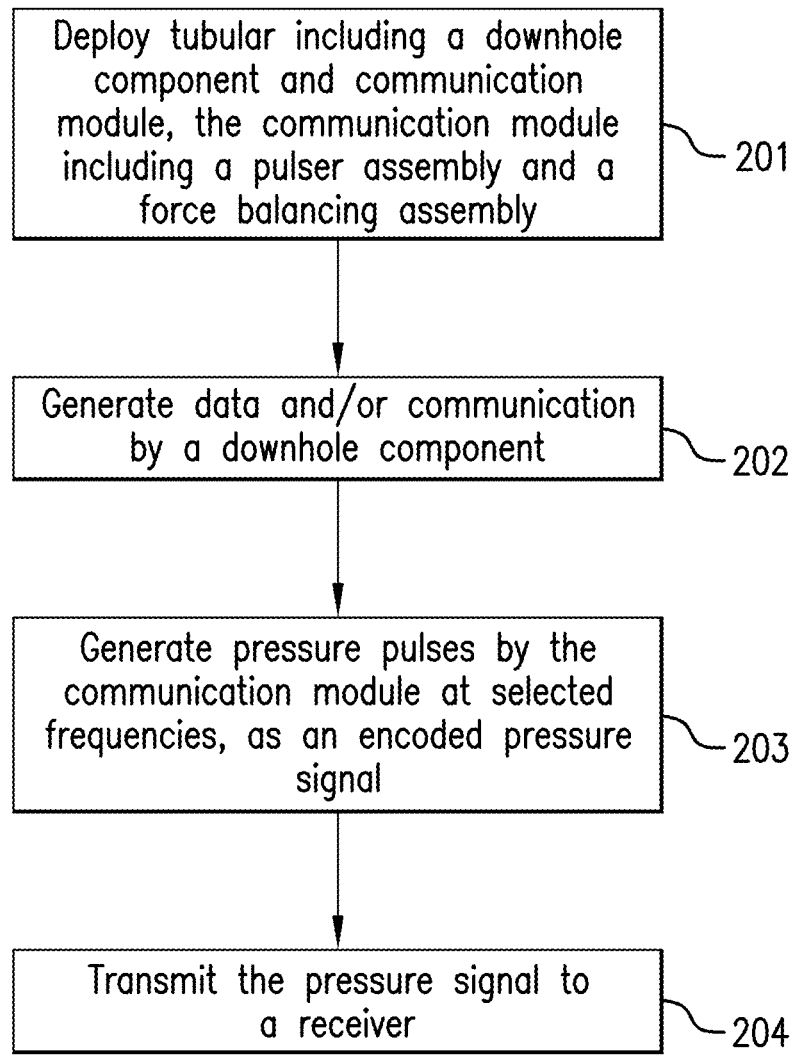
FIG. 7 is a flow chart depicting an embodiment of a method of communicating using a telemetry device.

FIG. 7 illustrates a method 200 of generating fluid pressure pulses, transmitting encoded pressure signals and communicating by mud pulse telemetry. The method 200 may be used in conjunction with the system 10, although the method 200 may be utilized in conjunction with any suitable type of device or system. The method 200 includes one or more stages 201-204. In one embodiment, the method 200 includes the execution of all of stages 201-204 in the order described. However, certain stages may be omitted, additional stages may be added, and/or the order of the stages may be changed.

In the first stage 201, a tubular such as the drill string 12 is deployed and the borehole 14 is drilled to a desired location or depth. During drilling, borehole fluid 22 is pumped through the drill string 12 and the BHA 20.

In the second stage 202, a downhole component such as the tool 30 and/or the BHA 20 generates data and/or communication in the form of, e.g., a digital signal. The digital signal is transmitted to the communication module 34. The frequency and stroke length of the pulser assembly 36 is selected for transmission. The stroke length is the difference between the open and closed (pulse) position, and is selected based on the desired signal pressure and the acceptable pressure restriction in the open position (the difference between the fluid pressure upstream the restriction 64 when the valve member 40 is at the open position and the fluid pressure upstream when the valve member 40 is at the closed position). As discussed above, when properly balanced, the actuation force used to move the valve member does not need to overcome hydraulic forces on the valve member 40 by the pressure differential. The actuation power is thus limited to other factors such as inertia factors (inertial loads and losses), friction, actuator losses and others.

In the third stage 203, the communication module 34 is operated to generate pressure pulses in the borehole fluid 22. For example, a processing device such as the downhole processor 50, a processor in the communication module 34 and/or another processor (e.g., a processor in the BHA 20 or the tool 30) operates the actuator assembly 42 to generate pulses at selected frequencies and/or amplitudes by varying the position of the valve member 40 according to the selected stroke length (or lengths).

In the fourth stage 204, the pressure pulses having selected signal pressures and frequencies are transmitted through the borehole fluid 22 to another component. For example, the pressure pulses are detected by the receiver 38 and processed. In one embodiment, a downhole component and/or the surface equipment 18 includes a telemetry device configured to transmit pulses downhole. The telemetry device may include a pulser assembly and a force balance assembly as described herein.

FIGS. 8-12 illustrate aspects of operating the communication assembly 34 and factors considered in selecting pulse length and other operational parameters. These aspects are regardless of any balancing mechanism (e.g., as shown in FIG. 2) and apply to reciprocating valves in general. As discussed above, to transmit a signal including pressure pulses, the valve member 40 is moved relative to the restriction 64 to generate pressure differentials that are transmitted upstream as pulses. When moving the valve member 40, the fluid pressure exerts a force $F_V$ on the valve member 40 that depends on the relative position of the valve member 40 to the restriction 64. The position of the valve member 40 is denoted as position x, which is an axial distance from the restriction 64 (e.g., a distance in a direction parallel to the axis A or otherwise parallel to a movement axis of the valve member 40).

Figure 8:
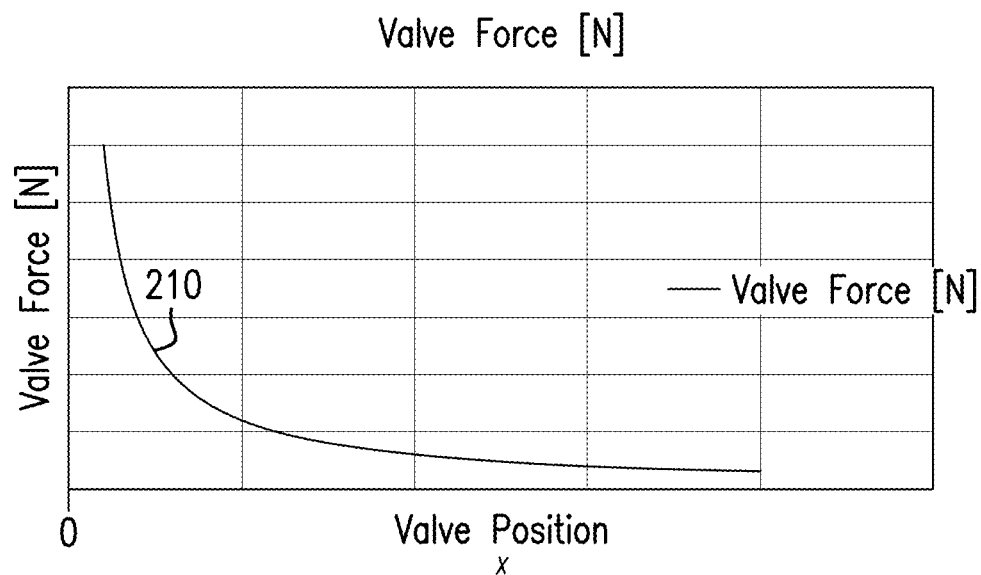
FIG. 8 is a graph showing a relationship between valve force and valve member position.
Figure 9:
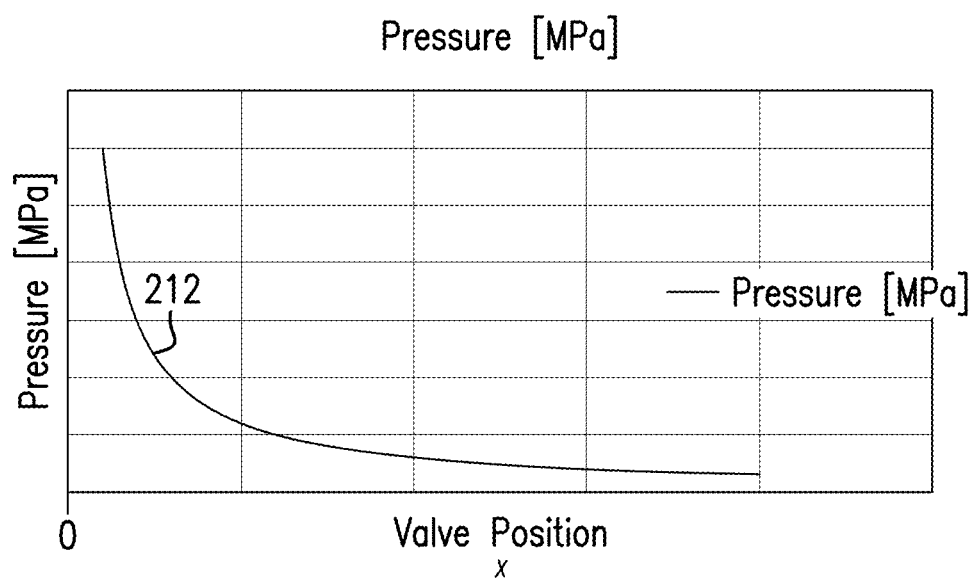
FIG. 9 is a graph showing a relationship between fluid pressure and valve member position.

FIG. 8 shows an example of the valve force $F_V$ on the valve member 40 as a function of position x, which corresponds to an axial distance between the valve member 40 and the restriction 64. In this example, the value of x is zero when the valve member 40 contacts the restriction 64 or is at a closest selected position relative to the restriction 64. The relationship between valve force and position is shown as a valve force curve 210. FIG. 9 shows the corresponding fluid pressure differential as a function of the position x, shown as a fluid pressure curve 212.

The open and closed positions may be selected in order to generate a selected signal pressure at a given flowrate. The difference between the open and closed position used when generating a pressure pulse is referred to as the stroke length or simply stroke. For example, referring to FIG. 10, the closed position is selected based on the pressure-position relationship to generate a selected signal pressure (pressure differential). The open position is selected so that the pressure differential at the restriction 64 is relatively low, and that the difference between the pressure differential at the open and closed position corresponds to the selected signal pressure. The low pressure drop in the open position reduces the erosion of valve components and other mechanical loads.

Figure 10:
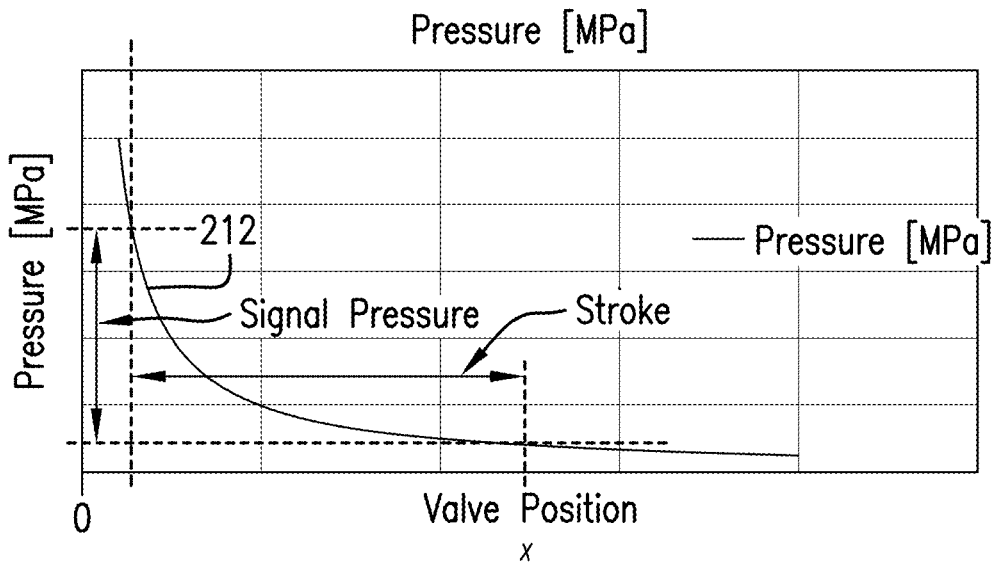
FIG. 10 illustrates fluid pressures exerted on a valve member operated according to a selected stroke length.
Figure 11:
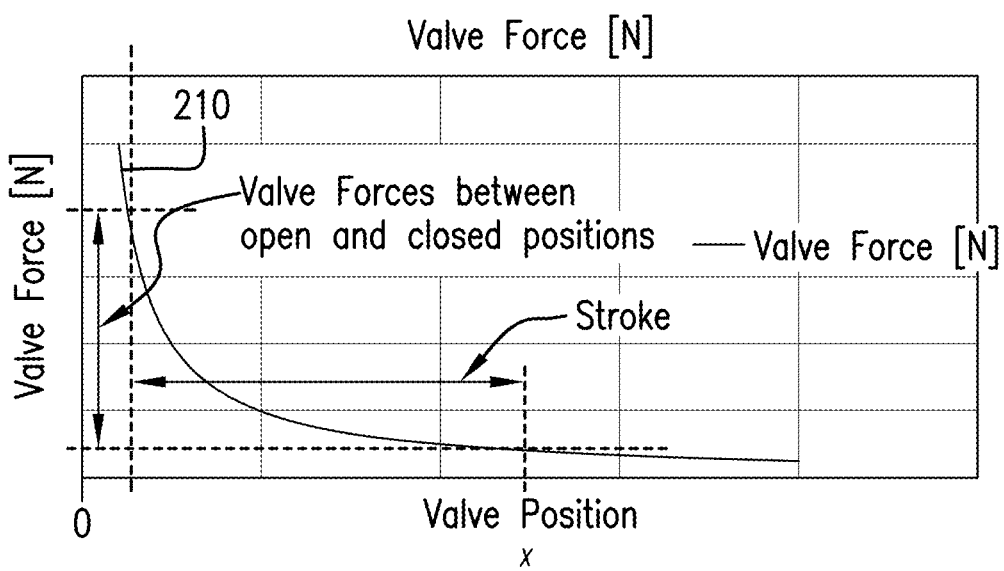
FIG. 11 illustrates valve forces exerted on the valve member operated according to the selected stroke length of FIG. 10.

FIG. 11 shows the valve force $F_V$ as a function of position x for the closed and open positions selected for FIG. 10. As shown, at an open position the required valve force would be at a comparably low level, while in a closed position the valve force is at magnitude according to the required pressure drop from FIG. 10. Various open and closed positions can be selected, leading to other forces and strokes.

Figure 12A:
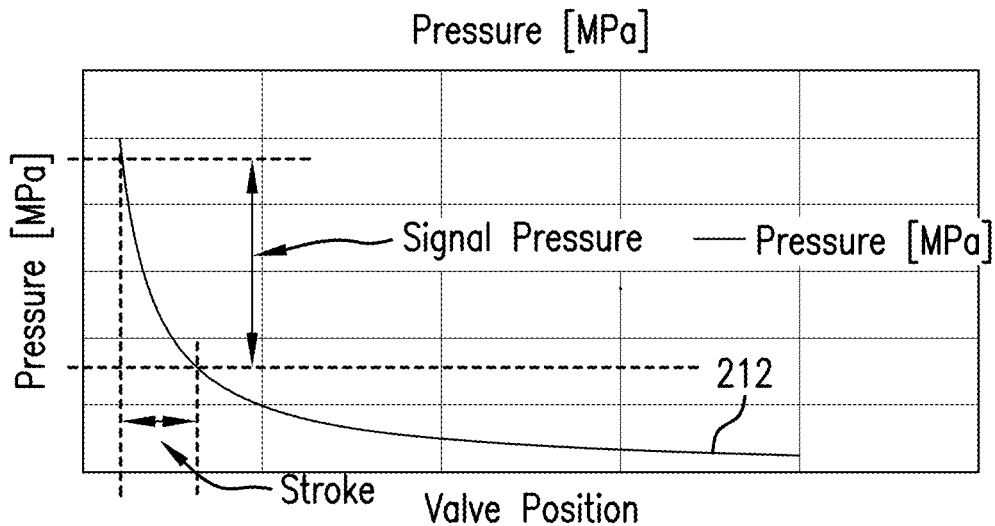
FIGS. 12A and 12B (collectively referred to as FIG. 12) illustrate fluid pressure and valve forces corresponding to an example of a selected stroke length.
Figure 12B:
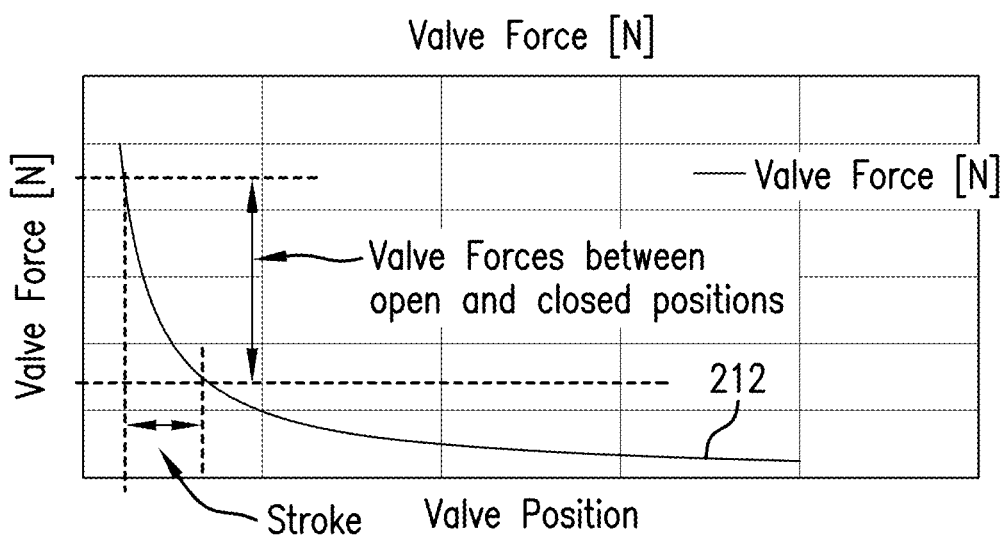

FIG. 12 depicts the pressure and valve force on the valve member 40 when using a smaller stroke length than that shown in FIGS. 10 and 11, but creating the same signal pressure. FIG. 12A shows the fluid pressure as a function of the valve position x and FIG. 12B shows the valve force $F_V$ as a function of the valve position. The closed position is selected at a high level of valve force and fluid pressure (e.g., at maximum permitted pressure with respect to erosion or maximum permitted valve forces with respect to drive mechanics) as compared to the stroke length of FIGS. 10 and 11, corresponding to an axial position in closer proximity to the restriction 64. By selecting the closed position at a relatively high level, the same signal pressure as in the previous example (FIGS. 10 and 11) can be achieved with a relatively small stroke since the exemplary pressure curve within the stroke rate of FIG. 12 is changing at a high rate with respect to position.

The actuator may be configured to precisely control the valve member position, while at the same time being able to supply a desired actuation force. Other positions and stroke lengths can be selected to achieve a desired pulse pressure. In general, the closer the closed position is to the restriction 64, the higher the mean pressure (open and closed pressure) and the higher actuation forces, but the smaller the required valve stroke. High pressure levels in general have the disadvantage of creating higher wear and erosion, while operating at smaller pressure levels demands higher stroke and hence higher dynamic loads inside the actuator.

As noted above, embodiments described herein significantly reduce the mechanical power that an actuator must exert to generate pulses having desired signal pressures and frequencies. For example, the communication module 34 can achieve the signal pressures without requiring relatively low power as compared to prior art systems not featuring a balancing assembly (e.g., the balancing assembly 44, thereby requiring less (electrical) power.

Figure 13:
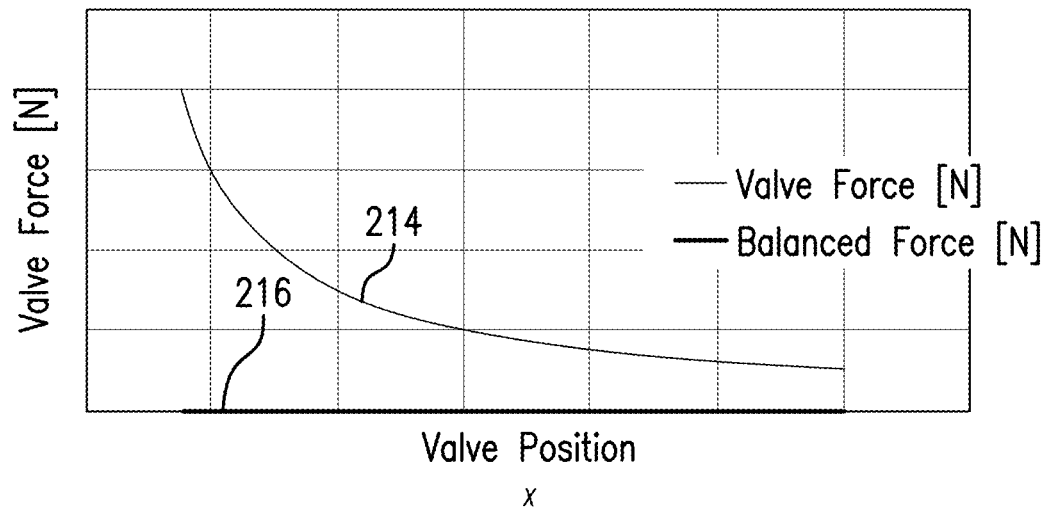
FIG. 13 depicts effects of a force balancing assembly on valve force on a valve member.
Figure 14:
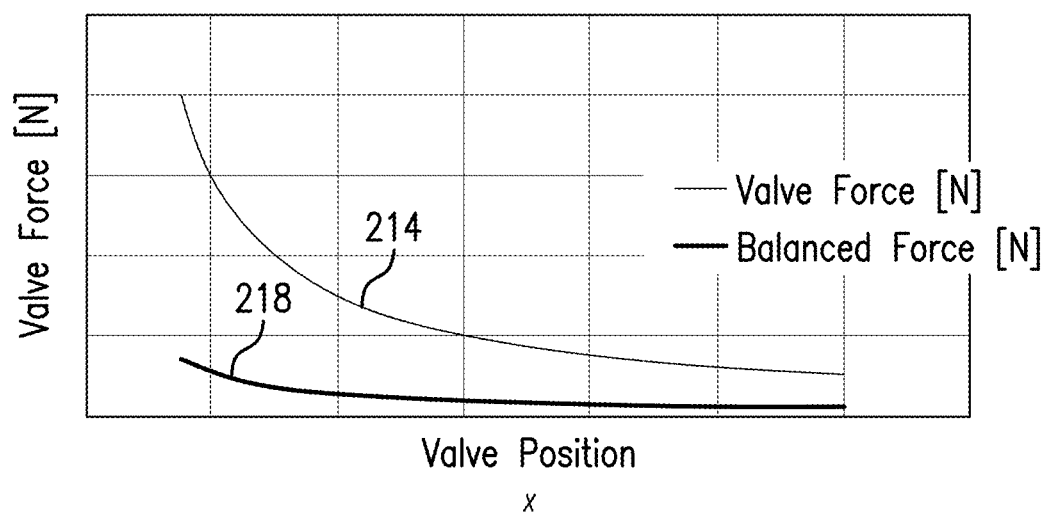
FIG. 14 depicts effects of a force balancing assembly on valve force on a valve member.

FIGS. 13 and 14 demonstrate the significant reduction in actuation force $F_A$ needed to generate desired pressure pulses according to embodiments described herein, as compared to prior art pulsers. In this example, the valve member 40 and the piston 66 are connected to the balancing assembly 44, and the force transmission ratio (e.g., gear ratio) of the force balancing assembly 44 is 1:1. FIG. 13 shows a plot of valve force as a function of valve position (curve 214) for a prior art pulser having a pulser assembly similar to the pulser assembly 36 but without a force balancing assembly. FIG. 13 also shows a plot of actuation force (curve 216) using the force balancing assembly 44 according to embodiments herein. As shown, the force balancing assembly 44 almost entirely balances the valve force, thus creating the values of curve 216 as the difference between force of valve member 40 and force of piston 66.

In some instances, it might be beneficial to not perfectly balance or over-compensate the valve opening force, for example to allow the valve member 40 to be pushed open by mud flow and without a drive being active. FIG. 14 shows a plot of actuation force as a function of valve position for a balancing piston at a smaller size compared to the example of FIG. 13, to maintain an opening force when fluid is flowing. The actuation force of the balancing assembly 44 for positioning of the valve accordingly in this example is shown by a curve 218.

Figure 15:
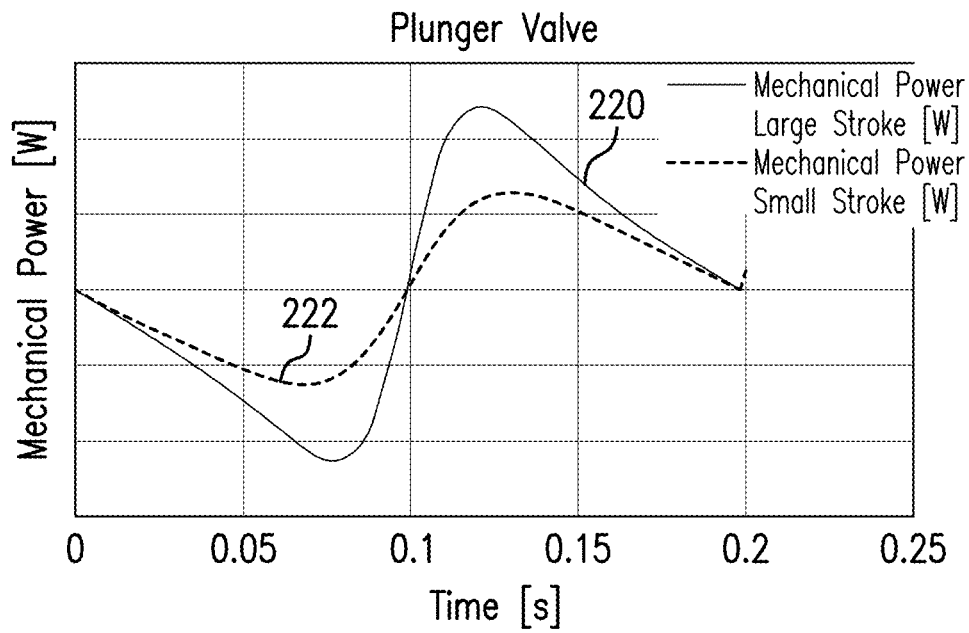
FIG. 15 depicts an example of mechanical power provided by an actuator on a prior art mud pulse telemetry valve member.
Figure 16:
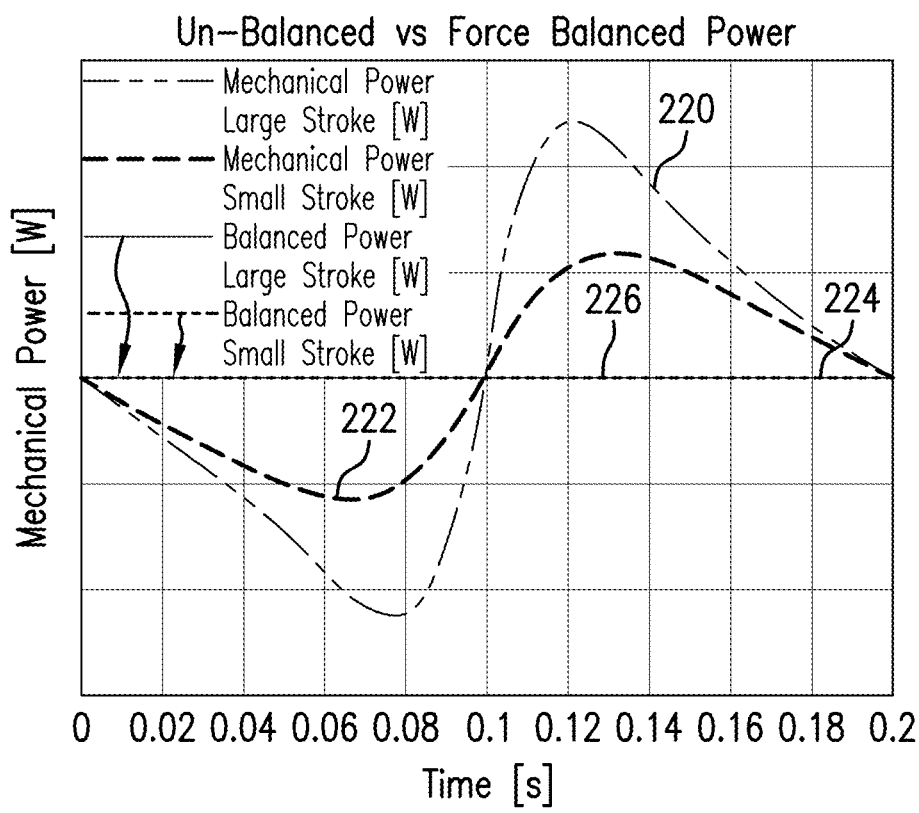
FIG. 16 depicts mechanical power provided by the actuator of FIG. 15 when coupled to a force balancing assembly.

FIGS. 15 and 16 demonstrate how using a force balancing assembly as described herein can significantly reduce the amount of mechanical power needed to drive a pulser. In this example, only the mechanical power needed to actuate against the valve force (Power=Valve Force times Valve Velocity) is considered.

FIG. 15 shows the mechanical power required to overcome hydraulic forces on a valve member of a prior art pulser assembly. Curve 220 shows the mechanical power required to overcome hydraulic forces as a function of time during a relatively large stroke, and curve 222 shows the mechanical power required for a relatively small stroke.

In this example, a relatively low actuation frequency and a sinusoidal actuation stroke is selected (5 Hz). The benefit of the much smaller stroke leads to reduced power required for the actuation at small stroke. As mentioned earlier, the high forces and required precision at high actuator forces might be difficult to achieve.

Since the mechanical power displayed in FIG. 15 is a function of valve velocity and forces, the power scales proportionally with velocity. In the case of sinusoidal movement, the power also scales proportionally with actuation frequency.

As noted above, other effects (e.g., inertia, friction, actuator losses, etc.) are not considered at this point. Since actuation forces at typical signal pressure levels can be quite high, the mechanical power demand to actuate prior art valves can be significant at higher actuation frequencies.

For instance, a demanded signal pressure can be 0.5 MPa, 2 MPa or 5 MPa. Actuation forces for prior art valves can have a respective magnitude of 1 kN, 2 kN or 10 kN. Actuation frequencies can range from 0.1 Hz to 100 Hz. Power demand at high values can therefore reach several kW.

FIG. 16 shows the required mechanical power for the example of FIG. 15 as compared to the required mechanical power using force balancing according to the embodiment of FIGS. 3-6. The mechanical power required to overcome hydraulic forces for the large stroke is shown as curve 224, and the mechanical power for the small stroke is shown as curve 226. As shown, the mechanical power is significantly reduced or almost entirely eliminated.

Since the mechanical power considered for this example is for simplicity calculated as a function of valve velocity and forces, the power scales also proportionally with actuation force. With balanced forces being orders of magnitude smaller than valve forces in prior art pulsers, the mechanical power can also be orders of magnitude smaller.

Even at high actuation frequencies, with balanced mechanical forces, the mechanical power to hydraulically activate the valve member 40 is low, as demonstrated by FIG. 16. With reduced demand to close the valve member 40 against the hydraulic force through the balancing mechanism, the required mechanical power and actuation force $F_A$ is reduced by factors or even orders of magnitude, depending on the size of the balancing piston, making the use of plunger valves feasible for data rate telemetry.

As noted above, with valve forces being balanced by the force balancing assembly, the required power to drive a valve member is significantly reduced. The actuator drive would primarily have to account for inertia loads and the losses, if correctly balanced hydraulically.

The inertia load can be calculated by deriving the stroke, velocity and acceleration to evaluate required power to overcome inertia losses.

Considering the pressure curve 212 (FIG. 9) and the valve force curve 210 (FIG. 8), selected valve positions (e.g., the open position, closed position, intermediate positions) and the exemplary design as shown in FIGS. 3 to 6, valve stroke, valve mass, transmission ratio of rotary (motor) to valve stroke, and rotating inertia can be evaluated and derived from an exemplary mechanical design. The required power to create a sinusoidal stroke can be computed therefrom. In the following example, only the inertial loads from acceleration of mass and rotating inertia are considered.

Figure 17:
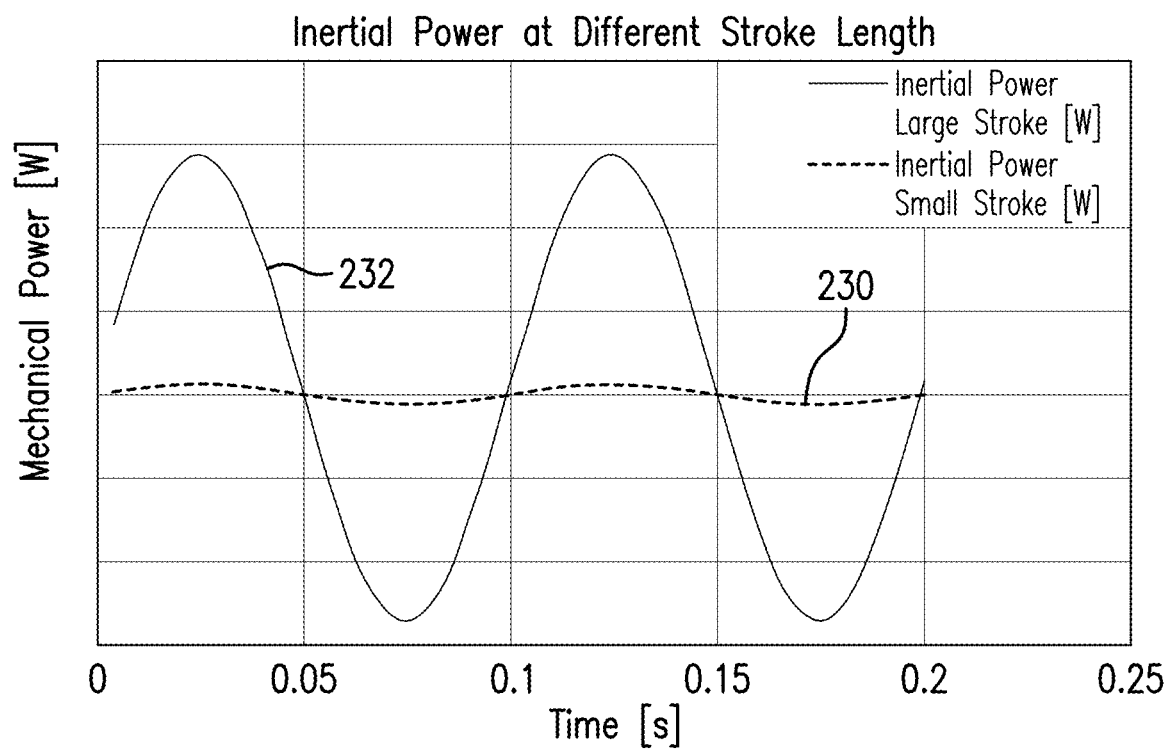
FIG. 17 depicts an example of inertial power as a function of stroke length.

FIG. 17 shows the calculated inertia power requirement (actuation power needed to overcome inertia forces) over time for the valve member 40 driven according to a 5 Hz sinusoidal movement. The required power for a small stroke is shown by curve 230, and the required power for a large stroke is shown by curve 232. As shown, valve stroke and hence rotary movement selected towards smaller values reduces the overall inertia loads, caused by the lower acceleration and velocity of moving components. An optimum case will finally be a negotiation between actuator forces (respectively motor torque), erosive wear, control accuracy and others.

If carrier frequencies can be adjusted to fixed levels, inertia loads can be effectively reduced (or cancelled) by added springs. For example, linear springs can be coupled to the valve member 40 and the piston 66, and/or torsional springs can be coupled to a motor shaft, or elsewhere.

While FIG. 17 displays the required power at 5 Hz, other frequencies can be analyzed. For a sinusoidal valve movement, the curve form remains identical, except the amplitude of the power demand scales with the third power of the actuation frequency—double the frequency causes 8 times ($2^3$) the power. For instance, if the maximum amplitude for the 5 Hz inertia power requirement according to FIG. 17 is 2 W, the power demand at double the frequency would be 2 W$\times 2^3$=16 W. For 4 times the frequency (20 Hz) the required power would be 2 W$\times 4^3$=128 W.

In order to encode signals with appropriate coding technology, valve movement with higher velocity and acceleration during a pulse cycle may be desired, as compared to the sinusoidal movement of FIG. 17. In addition, pressure signals can be configured in various ways, and are not limited to the above examples. For example, the valve member 40 can be driven to move with different velocities through the low pressure cycle and through the high pressure cycle of the pressure curve.

Figure 18:
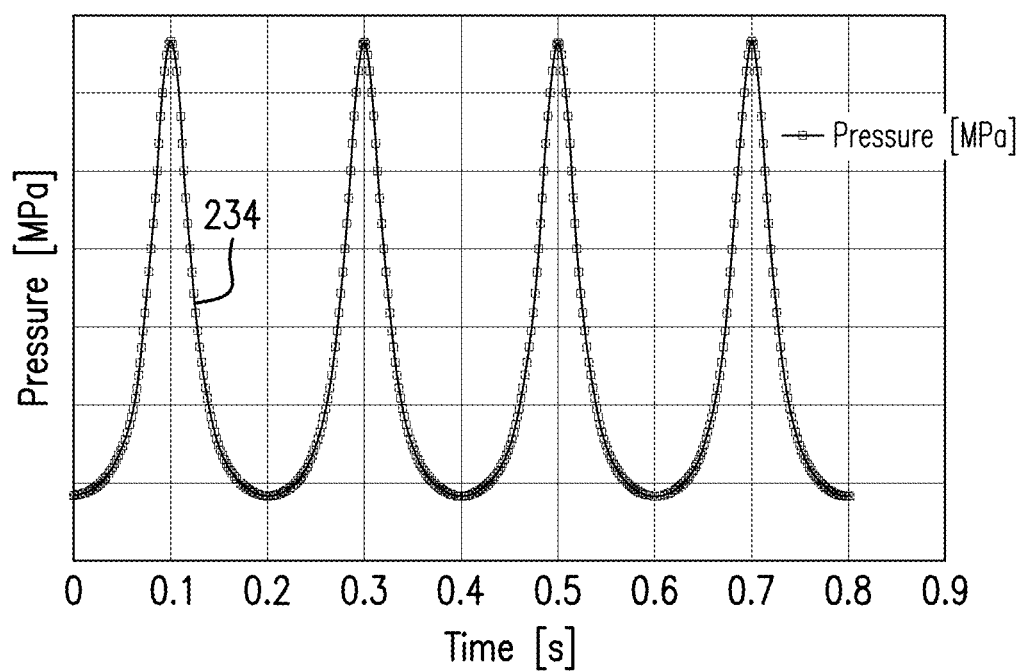
FIG. 18 depicts an example of an encoded mud pulse telemetry pressure signal with a sinusoidal stroke.

FIG. 18 shows a pressure curve 234 corresponding to actuation of the valve member 40 using sinusoidal action and the stroke length shown in FIGS. 10 and 11.

Figure 19:
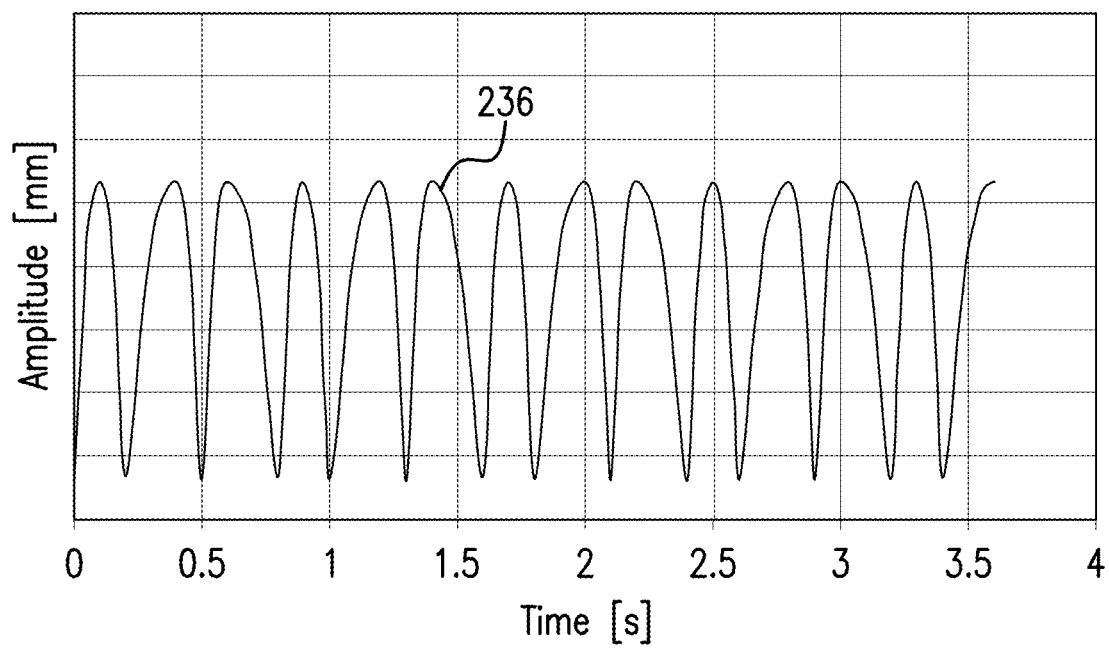
FIG. 19 depicts an example of an encoded mud pulse telemetry valve position.

Shaping the actuation curve allows for creation of a more accurate sine function for the pressure signal with less high harmonic content and thus increased signal strength in the carrier frequency. FIG. 19 shows a stroke (amplitude) curve 236 representing such an example for a shaped sine actuation with higher velocity through the valve open area and lower velocity during the high pressure time of a stroke. The skewed parts of the curve of FIG. 19 is an example of a signal coding. For other frequencies, the signal might simply be scaled in time.

Figure 20:
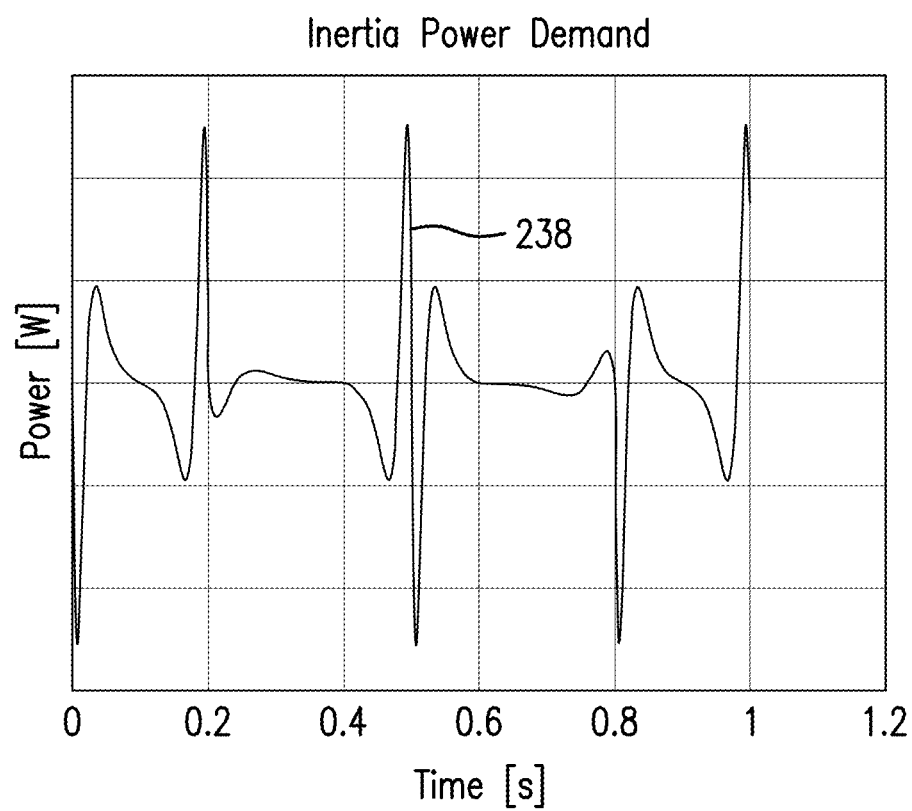
FIG. 20 depicts inertia power demand according to the valve position curve of FIG. 19.

In evaluating actuation power demand according to the example of FIG. 19, it should be recognized that, during high acceleration phases (typically occurring when changing phase or frequency for signal coding), the power required will also be high. FIG. 20 shows an inertia power demand curve 238 representing the required power to account for rotary acceleration of the rotating components and linear acceleration of reciprocating masses as presented in FIG. 3.

As shown in FIG. 20, high peak loads occur during phases of high acceleration. Reduction in stroke, or other measures such as adding springs, can reduce the power demand. For a more holistic power assessment the curves for the hydraulic power (FIG. 16) and the inertial demand (FIG. 20) can be superimposed.

Signals can be encoded using various protocols, such as frequency shift keying (FSK), phase shift keying (PSK), amplitude shift keying (ASK). Other examples include more recent coding options such as quadrature phase shift keying (QPSK), quadrature amplitude shift keying (QASK), other time based technologies such as pulse position modulation (PPM), and others.

Set forth below are some embodiments of the foregoing disclosure:

Embodiment 1: A device for generating pressure pulses, the device comprising: a valve member disposed in a fluid passageway, the fluid passageway including a restriction, the valve member movable by an actuator relative to the restriction to generate a pressure pulse in a fluid in the fluid passageway based on varying a relative position between the valve member and the restriction and creating a differential pressure across the fluid passageway, the differential pressure applying a first force on the valve member; and a piston member in hydraulic communication with the differential pressure, the differential pressure applying a second force on the piston member, the piston member having a locomotive mechanical connection to the valve member.

Embodiment 2: The device of any prior embodiment, wherein the mechanical connection is configured to transmit the second force to the valve member and apply the second force in a direction opposite the first force.

Embodiment 3: The device of any prior embodiment, wherein the mechanical connection is configured to transmit the first force to the piston member and apply the first force in a direction opposite the second force.

Embodiment 4: The device of any prior embodiment, wherein the mechanical connection is configured to alternately reverse the direction of the first force and the second force.

Embodiment 5: The device of any prior embodiment, wherein the mechanical connection includes one of: a rocker lever mechanism, a rack and pinion gearbox, a crank device, a cam device, a wobble plate, and a hydraulic linkage.

Embodiment 6: The device of any prior embodiment, wherein the mechanical connection has a transmission ratio selected from a ratio of 1:1 and a ratio that is different than 1:1.

Embodiment 7: The device of any prior embodiment, wherein a size of the piston member and a transmission ratio is selected to maintain an opening force when the fluid is flowing through the passageway.

Embodiment 8: The device of any prior embodiment, wherein the actuator includes one of: a bevel gear and a crankshaft configured to create a linear motion; a ball screw drive configured to create a linear motion; a direct connection to the pinion driving the rack; and a direct connection to the rocker lever mechanism.

Embodiment 9: The device of any prior embodiment, wherein the actuator includes an electric motor and a position feedback device.

Embodiment 10: The device of any prior embodiment, wherein the actuator includes a pressure compensator.

Embodiment 11: The device of any prior embodiment, wherein the relative position is altered in a manner to create a frequency modulated pressure signal upstream the passageway with multiple frequencies, wherein at least one of the multiple frequencies and a phase of the frequencies are shifted for data transmission in the flowing fluid.

Embodiment 12: The device of any prior embodiment, wherein the valve member is mechanically coupled to a spring.

Embodiment 13: The device of any prior embodiment, wherein the spring is configured to create an oscillator with the inertia of moving components, a first natural frequency of the oscillator selected to be in a range of 25% to 200% of one of selected frequencies of a modulated pressure signal.

Embodiment 14: The device of any prior embodiment, wherein the spring is configured to maintain an intermediate stroke position of the valve member with respect to the passageway Embodiment 15: The device of any prior embodiment, wherein the valve member and the piston member are positioned concentrically.

Embodiment 16: The device of any prior embodiment, wherein the locomotive mechanical connection and the electric motor are hydraulically separated through a membrane, the membrane defining a cavity filled with another fluid, the another fluid different than the fluid in the passageway.

Embodiment 17: A method of generating pressure pulses, the method comprising: receiving a communication at a processing device, the processing device configured to control a communication module including a valve member and a restriction disposed in a fluid passageway; controlling, by an actuator, movement of the valve member relative to the restriction to generate pressure pulses in a fluid in the passageway based on varying a relative position between the valve member and the restriction and creating a differential pressure across the passageway, the differential pressure applying a first force on the valve member; and transmitting the pressure pulses through the fluid to a receiver, wherein: the communication module includes a piston member in hydraulic communication with the differential pressure, the differential pressure applying a second force on the piston member, the piston member having a locomotive mechanical connection to the valve member.

Embodiment 18: The device of any prior embodiment, wherein the mechanical connection is configured to transmit the second force to the valve member and apply the second force in a direction opposite the first force.

Embodiment 19: The method of any prior embodiment, wherein the relative position of the valve member is controlled according to at least one of a flow rate through the passageway and a density of fluid flow through the passageway.

Embodiment 20: The method of any prior embodiment, wherein the valve member is controlled to create pressure pulses, the pressure pulses configured as at least one of: a frequency modulated pressure signal upstream the passageway, an amplitude modulated pressure signal upstream the passageway, and a pulse time modulated pressure signal upstream the passageway.

The use of the terms "a" and "an" and "the" and similar referents in the context of describing the invention (especially in the context of the following claims) are to be construed to cover both the singular and the plural, unless otherwise indicated herein or clearly contradicted by context. Further, it should be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The teachings of the present disclosure may be used in a variety of well operations. These operations may involve using one or more treatment agents to treat a formation, the fluids resident in a formation, a wellbore, and/or equipment in the wellbore, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. A device for generating pressure pulses, the device comprising:
   a valve member disposed in a fluid passageway, the fluid passageway including a restriction, the valve member movable by an actuator relative to the restriction to generate a pressure pulse in a fluid in the fluid passageway based on varying a relative position between the valve member and the restriction and creating a differential pressure across the fluid passageway, the differential pressure applying a first force on the valve member; and
   a piston member in hydraulic communication with the differential pressure, the differential pressure applying a second force on the piston member, the piston member having a locomotive connection to the valve member, wherein the actuator includes an electric motor and is configured to apply a third force on the valve member to generate the pressure pulse.

2. The device of claim 1, wherein the locomotive connection is configured to transmit the second force to the valve member and apply the second force in a direction opposite a direction of the first force.

3. The device of claim 1, wherein the locomotive connection is configured to transmit the first force to the piston member and apply the first force in a direction opposite a direction of the second force.

4. The device of claim 1, wherein the locomotive connection is configured to alternately apply the first force in a direction opposite a direction of the second force and apply the second force in a direction opposite a direction of the first force.

5. The device of claim 1, wherein the locomotive connection includes one of: a rocker lever mechanism, a rack and pinion gearbox, a crank device, a cam device, a wobble plate, and a hydraulic linkage.

6. The device of claim 1, wherein the locomotive connection has a transmission ratio of 1:1.

7. The device of claim 1, wherein a size of the piston member and a transmission ratio of the locomotive connection is selected to maintain an opening force for fluid in the fluid passageway to flow through the fluid passageway.

8. The device claim 1, wherein the actuator includes one of:
   a bevel gear; and
   a ball screw drive.

9. The device of claim 1, wherein the actuator includes a position feedback device.

10. The device of claim 1, wherein the actuator includes a pressure compensator.

11. The device of claim 1, wherein the pressure pulse includes a frequency modulated pressure signal in the fluid in the fluid passageway, the frequency modulated pressure signal having multiple frequencies, wherein the multiple frequencies are used for data transmission in the fluid in the fluid passageway.

12. The device of claim 1, wherein the valve member is mechanically coupled to a spring.

13. The device of claim 12, wherein the pressure pulse includes a frequency modulated pressure signal, the frequency modulated pressure signal having multiple frequencies, the spring is configured to create an oscillator including an inertia, a first natural frequency of the oscillator is selected to be in a range of 25% to 200% of one of the multiple frequencies of the frequency modulated pressure signal.

14. The device of claim 12, wherein the spring is configured to maintain an intermediate stroke position of the valve member with respect to the restriction in the fluid passageway.

15. The device of claim 1, wherein the locomotive connection and the electric motor are hydraulically separated through a membrane, the membrane defining a cavity filled with another fluid, the another fluid different than the fluid in the fluid passageway.

16. The device of claim 1, further comprising a processor, wherein the processor causing the actuator to apply the third force on the valve member to generate the pressure pulse for data transmission in the fluid in the fluid passageway.

17. The device of claim 1, wherein the actuator applies the third force on the locomotive connection.

18. A device for generating pressure pulses, the device comprising:
   a borehole string in a borehole, the borehole string having a bore defining a fluid passageway;
   a fluid circulating though the borehole;
   a bottom hole assembly in the borehole string including a valve member disposed in the fluid passageway, the fluid passageway including a restriction, the valve member movable by an actuator relative to the restriction to generate a pressure pulse in the fluid in the fluid passageway based on varying a relative position between the valve member and the restriction and creating a differential pressure across the fluid passageway, the differential pressure applying a first force on the valve member; and a piston member in hydraulic communication with the differential pressure, the piston member having an end extending through an opening in the fluid passageway, the differential pressure applying a second force on the piston member, the piston member having a locomotive connection to the valve member, wherein all of the fluid circulating through the borehole passes through the restriction and the opening.

19. A device for generating pressure pulses, the device comprising:
   a valve member disposed in a fluid passageway, the fluid passageway including a restriction, the valve member movable by an actuator relative to the restriction to generate a pressure pulse in a fluid in the fluid passageway based on varying a relative position between the valve member and the restriction and creating a differential pressure across the fluid passageway, the differential pressure applying a first force on the valve member; and
   a piston member in hydraulic communication with the differential pressure, the differential pressure applying a second force on the piston member and moving the piston member in a piston member stroke direction, the piston member having a locomotive connection to the valve member, wherein the locomotive connection is configured to transmit the first force to the piston member and apply the first force to the piston member in a direction opposite a direction of the second force and move the valve member in a valve member stroke direction opposite the piston member stroke direction.

20. The device of claim 19, wherein the locomotive connection is configured to transmit the second force to the valve member and apply the second force to the valve member in a direction opposite a direction of the first force.

* * * * *